Dec. 23, 1930.                H. R. KRIEGH                1,786,307
                                AEROPLANE
                         Filed Dec. 17, 1928        4 Sheets-Sheet 2
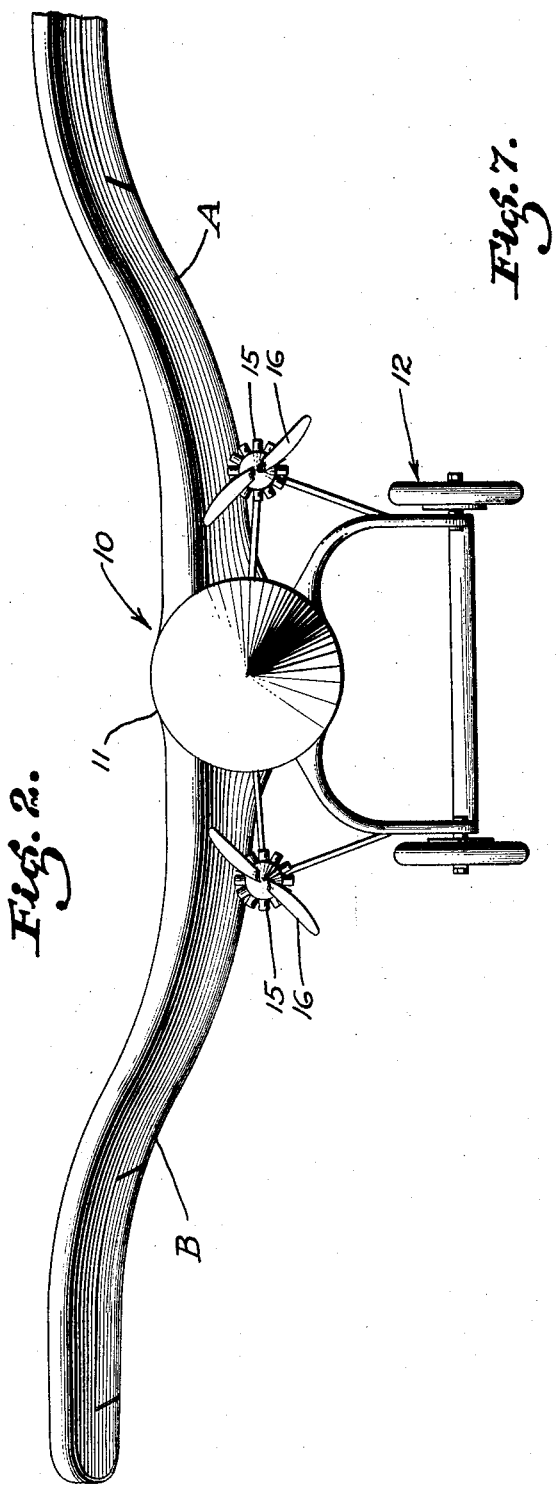
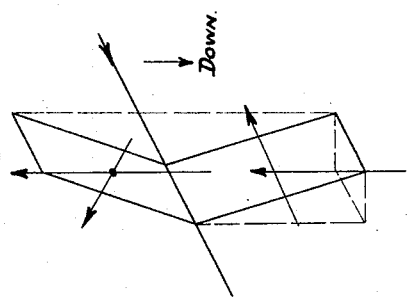
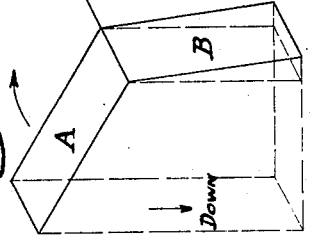
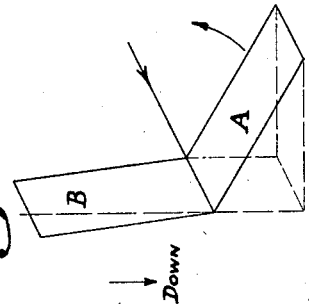
INVENTOR.
Hobart R. Kriegh.
BY
Townsend, Loftus & Abbett
ATTORNEYS.

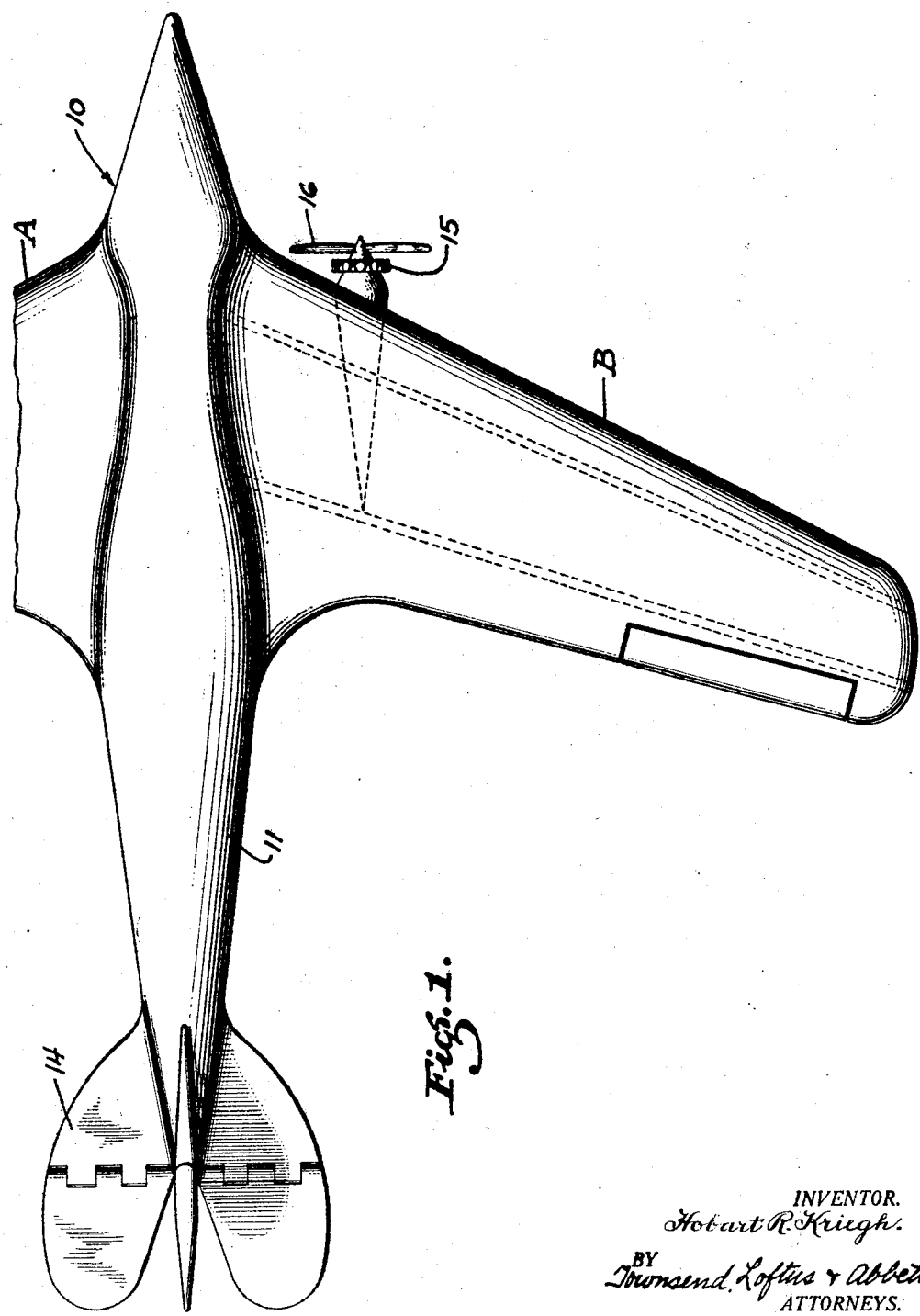

Dec. 23, 1930.   H. R. KRIEGH   1,786,307
AEROPLANE
Filed Dec. 17, 1928   4 Sheets-Sheet 3

INVENTOR.
Hobart R. Kriegh.
BY Townsend, Loftus & Abbett
ATTORNEYS.

Dec. 23, 1930.  H. R. KRIEGH  1,786,307
AEROPLANE
Filed Dec. 17, 1928  4 Sheets-Sheet 4
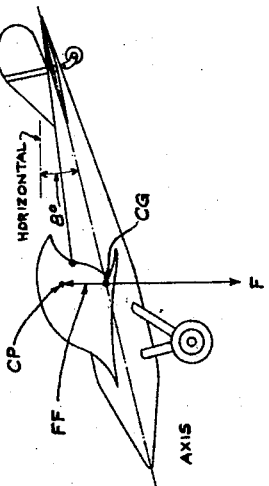
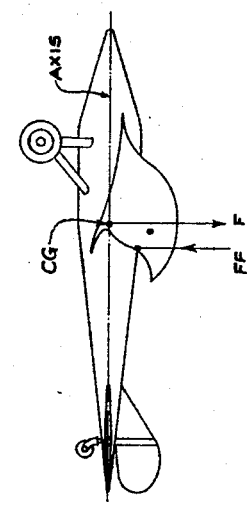
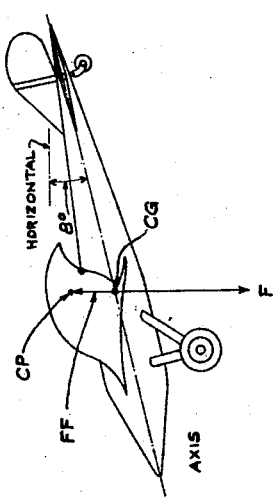
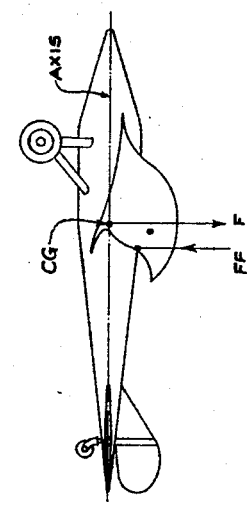
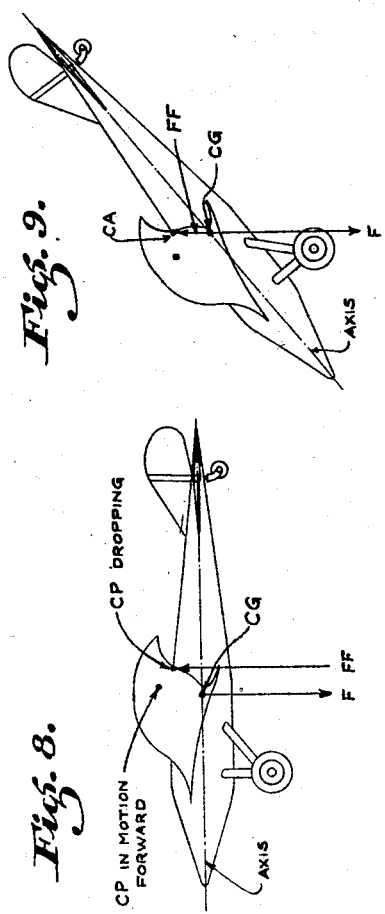
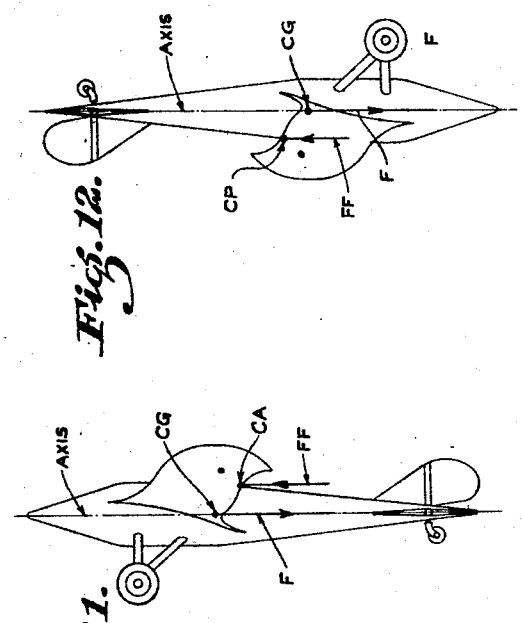
INVENTOR.
Hobart R. Kriegh.
BY Townsend, Loftus & Abbett
ATTORNEYS.

Patented Dec. 23, 1930

1,786,307

UNITED STATES PATENT OFFICE

HOBART R. KRIEGH, OF ALBANY, CALIFORNIA

AEROPLANE

Application filed December 17, 1928. Serial No. 326,565.

This invention relates to aircraft of the heavier than air type. It is the principal object of the present invention to improve the aerodynamic characteristics of heavier than aircraft by providing a wing design which will cause a plane constructed in accordance with the present invention to automatically return to normal position in the air from any static position or any position in motion and assume a steady glide without the necessity of the operation of the controls.

In carrying out the invention into practice I so construct the wings that when the plane tilts about its longitudinal axis in either direction a differential of pressures between the wings and the relative positions of the center of pressure, the center of gravity and the center of area causes the plane to return to a normal and gliding position. Thus I am able to eliminate side slipping and tail spins without the necessity of operating the controls.

One form which the invention may assume is exemplified in the following description and illustrated by way of example in the accompanying drawings, in which:

Fig. 1 is a plan view of an aeroplane constructed in accordance with my invention.

Fig. 2 is a front elevation of the same.

Figure 3:
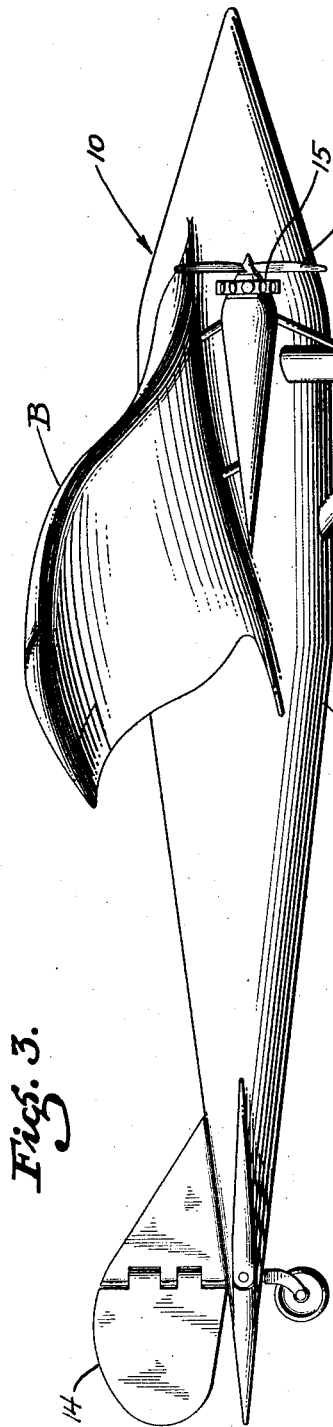
Fig. 3 is a side elevation of the plane.
Figure 4:
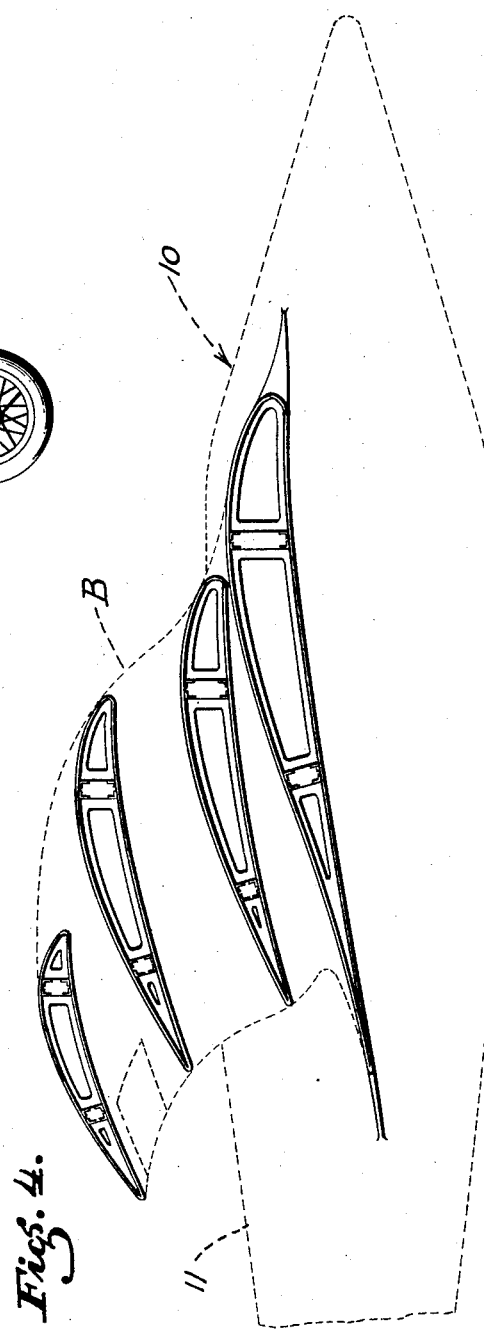
Fig. 4 is an enlarged schematic view in side elevation showing different wing sections.

Figs. 5 to 13 inclusive are diagrammatic views showing the manner in which the present wing design embodying the invention causes the plane to automatically assume a normal and stable position from positions of stall and the like.

Referring more particularly to the accompanying drawings, 10 generally indicates a monoplane constructed in accordance with my present invention. This monoplane comprises a torpedo shaped fuselage 11 having a landing gear 12. The fuselage is equipped with the usual rudder and elevators 14 at the tail of the fuselage. Projecting from opposite sides of the fuselage are wings A and B which are equipped with ailerons of any preferred type. It should be stated here that the present invention is not particularly concerned with the controlling or driving apparatus of the plane and that these elements may be of any standard or preferred type. The power plant of the plane consists of a pair of motors 15 arranged at opposite sides of the fuselage. These motors drive propellers 16 to propel the plane.

The present invention is particularly concerned with the design of the wings. It will be noticed from Fig. 2 that the wings project upwardly at a slight angle to the horizontal. The wings, however, are not perfectly straight but are contoured in a gentle reverse curve. The angle between the wings from the center of the fuselage is approximately 170 degrees. This arrangement of the wings prevents side slipping. That is to say, when the plane revolves about the longitudinal axis of the fuselage, the pressure on the lowermost wing becomes greater, due to the angularity of the wings, than the pressure on the uppermost wing. This difference in pressure causes the plane to revolve until the pressures are equal.

The wings of the plane are also rearwardly directed to a certain degree. I prefer to term this rearward inclination of the wings the back batter of the wings. This back batter of the wings is very important in the stabilization of the plane as will be hereinafter described.

The wings each are formed with a varied angle of attack which is the angular disposition of the plane with relation to the longitudinal axis of the fuselage or line of flight. The wings have the lesser angle adjacent the fuselage. This angle gradually increases to the tips of the wings. As shown in Fig. 1, the angle of attack is 6 degrees at the fuselage and increases to 15 degrees at the tip.

This varied angle of attack has several advantages among which is the fact that it enables the plane to take off more rapidly. However, the upward inclination of the wings, the back batter of the wings and the varied angle of attack combine to cause the plane to assume a normal position from any static position or position in motion.

For example, reference being had to the diagram shown in Fig. 5, should the plane be in a position to side slip as illustrated therein, the angle between the wing A and the horizontal will be 30 degrees and the angle between the wing B and the horizontal will be 40 degrees or a difference of ten degrees regardless of the tilting of the plane. Therefore, the pressure on wing A will be greater than the pressure on the wing B and the plane will revolve about its longitudinal axis until a position of equilibrium is reached where the pressure is equal on both wings. Therefore, the plane will rotate automatically about its longitudinal axis and assume a normal position.

Should the plane invert and commence to drop, as shown in the diagram in Fig. 6, any tilting of the plane will cause unequal pressure on the wings, revolving the plane back to normal position. For example, should the angle between the wing A and the horizontal be 50 degrees and the angle betweeen the wing B and the horizontal be 60 degrees the pressure on wing A will equal 600 P cos 50 degrees or 385.8 P. The pressure on wing B will equal 600 P cos 60 degrees or 300 P. Thus, the unequal pressure created will elevate wing A and move wing B downwardly until the plane rights itself.

Should the plane assume a position with the wings arranged vertically, as shown in the diagram in Fig. 7, the pressure then on the wings is the same but the pressure on wing B is upward, the component acting at right angles to the plane acting anti-clockwise and that on wing A also acting anti-clockwise which will rotate the plane about the longitudinal axis of the fuselage to the position shown in the diagram in Fig. 5.

As before stated the plane with the power shut off and the controls in neutral will automatically right itself within a 200 foot drop and then take up a glide at an angle of approximately 8 degrees. For example, consider the plane suspended in the position shown in Fig. 8 and then cut loose at an elevation of say 2000 feet. There are then two forces acting upon the plane as the plane commences to descend.

The first force is designated by the letter F acting downwardly through the center of gravity designated by CG, F representing the weight of the plane. The second force or that designated by FF acts vertically upward and represents the air pressure through the center of area of the entire plane. The center of area is designated by the letters CA and the center of pressure is designated by the letters CP. The forces not being colinear act in a couple rotating the plane anti-clockwise until F passes through FF which is the position shown in Fig. 9.

The plane upon assuming this later position takes on velocity along its axis and when this velocity reaches the speed at which the plane must rise, the center of pressure having shifted forward as shown in Fig. 8 due to pressure being partially relieved from the underneath of the fuselage and from the tail, the plane will rotate clockwise gradually as the center of pressure has shifted forward to its maximum amount and will then have taken on the position of gliding shown in Fig. 10.

The plane will continue to glide at this speed, for if the speed increases the force FF will exceed the force F and the plane will rise and if the speed decreases, the center of pressure CP will shift backward due to a dropping motion which will cause the plane to nose down until it has acquired sufficient velocity to rise again.

Now consider the position of the plane shown in Fig. 11 with its nose upward which is the maximum position of the stall. In this position the center of pressure still being considered in the center of area, two forces F, acting downward through the center of gravity CG, and the force FF upward through the center of pressure CP or the center of area CA, form a couple which will rotate the plane in an anti-clockwise direction until the plane is in position shown in Fig. 8.

In Fig. 12 the position of the plane is with the nose down and axis vertical which is the maximum position of the nose dive. The two forces F and FF acting as a couple rotate the plane to the position shown in Fig. 9.

When the plane assumes the position in which the center of gravity is directly above the center of pressure, the unstable position resulting would not hold for more than a moment since the angle of attack would act from the back of the wings, causing the plane to come into the position on its back as shown in Fig. 13. In this position the two forces form a couple which will rotate the plane in an anti-clockwise direction until the plane assumes the position shown in Fig. 12 as previously described.

Therefore, it is obvious that regardless of what position the plane assumes in the air it will automatically and almost immediately assume a position of stability. Thus, by the peculiar formation of the wings, that is to say, their vertical and rearward inclination, the relative positions of the center of gravity, the center of pressure and the center of area are so arranged that the plane will assume a position of stability automatically, particularly when combined with the feature of causing a differential in pressures when one wing tilts lower than the other.

The varied angle of attack of the plane causes the plane to be both stable and to permit it to ascend more rapidly than planes with a constant angle of attack.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. An aeroplane comprising a fuselage, wings extending laterally of the fuselage, said aeroplane being equipped with driving and propelling means, said wings being upwardly and rearwardly inclined, said wings presenting a varied angle of attack gradually increasing from the inner to the outer ends of the wings.

2. An aeroplane comprising a fuselage, wings extending laterally of the fuselage, said aeroplane being equipped with driving and propelling means, said wings being upwardly inclined and contoured in a gentle reverse curve, the outer ends of said wings being disposed at a point to the rear of the inner ends of the wings, the angle of attack of said wings gradually increasing from the inner to the outer ends of the wings.

3. An aeroplane comprising a fuselage, wings extending laterally of the fuselage, said aeroplane being equipped with driving and propelling means, said wings being contoured in a gentle reverse curve and inclined upwardly at an angle of approximately five degrees from the horizontal, said wings having a back batter and presenting a varied angle of attack gradually increasing from the inner to the outer ends of the wings.

4. An aeroplane of the character described including a fuselage and a pair of wings extending laterally and rearwardly therefrom, said wings extending in a horizontal plane then upwardly upon the arc of a reversed curvilinear helix, then horizontally again to their ends, said wings also having a varied angle of attack gradually increasing from their inner to their outer ends.

HOBART R. KRIEGH.